United States Patent Office 3,252,761
Patented May 24, 1966

3,252,761
REAGENTS FOR VANADIUM
Ervin Jungreis, Jerusalem, Israel, assignor to Yissum Research Development Company, Jerusalem, Israel, a company of Israel
No Drawing. Filed Oct. 19, 1964, Ser. No. 404,923
Claims priority, application Great Britain, Oct. 30, 1963, 42,921/63
9 Claims. (Cl. 23—230)

It is an object of the present invention to provide a novel reagent for the detection and determination of vanadium. It is a further object of the invention to provide a specific reagent for the detection of vanadium in the presence of other cations. It is yet a further object of the present invention to provide a novel medium for the detection of vanadium by means of spot-test. It is still a further object of the present invention to provide a novel method for the determination of vanadium. Other and further objects of the invention will become apparent hereinafter.

Hitherto a great number of reagents and analytical procedures have been proposed for the detection and for the determination of vanadium, especially in ores and in steels. Most of these are not satisfactory as they are not specific enough. Conventional methods are generally based on the oxidation of a reagent by vanadic acid, so as to give a visibly detectable color reaction. The color reactions of leuco-methylene blue, tetra-base, p-amino dimethylaniline, diphenylamine, benzidine and the like are far from specific as also other cations of higher valency, certain peroxides and halogens give similar color-reactions. Also the precipitation of ammonium molybdate or piperazine with vanadic acid and the catalysis of certain redox reactions are unspecific and rather complicated.

According to the present invention there is provided a novel and specific reagent for pentavalent vanadium, namely the Schiff base obtained from anthranilic acid and salicylaldehyde:

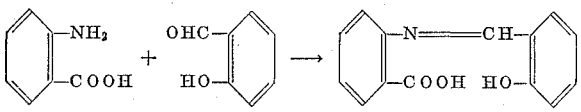

This reagent can be prepared by first preparing a solution of 400 mg. anthranilic acid in 20 ml. ethanol and 5 ml. benzene; a second solution of 12 ml. salicylaldehyde in 4 ml. ethanol; admixing both these solutions and bringing same to a total volume of 100 ml. by addition of benzene. After about 1 hour in a water bath of 40–50° C. or after standing overnight at room temperature the reagent is ready for use. The substantial excess of salicyladehyde is used in order to suppress hydrolysis. Solvents in which hydrolysis takes place are clearly unsuitable.

A test solution for obtaining a calibration curve is prepared by dissolving vanadium in aqua regia, diluting and adding 1 N potassium permanganate so as to obtain a slight violet tinge. The solution is then diluted so as to obtain a range of concentrations from 10 μg to 100 μg vanadic acid per ml., in steps of 10 μg. To each ml. of the test solution there is added 0.5 ml. of the reagent solution and the mixture is thoroughly shaken. After appearance of the dark organic layer, benzene is added so as to make up the volume of the organic layer to 3.5 ml. This is best carried out in graduated stoppered centrifuge tubes.

The organic layer is transferred to a 10 mm. Pyrex cell and the optical density is measured at 520 mμ. in a recording spectrophotometer. The blank was prepared using the same quantity of reagent, solvent and water. By this procedure there is prepared a calibration curve which complies with Beer-Lambert's law. The actual determination is carried out in identical manner and the optical density is compared with the calibration curve.

As iron gives a violet color with salicylaldehyde, its presence interferes with the determination. This difficulty can be overcome by the addition of 3 N phosphoric acid. About one drop is sufficient for masking 5 mg. iron which is about 50–100 times the quantity of vanadium.

By this procedure it is possible to detect in a convenient manner the presence of vanadium in steels. The presence of tungsten, molybdenum or chromium interferes with a quantitative determination of vanadium in steels as the presence of the phosphoric acid used for masking the iron results in the formation of compounds such as tungstovanadophosphate, which take up part of the vanadate.

The color reaction of the novel reagent with pentavalent vanadium is specific and neither molybdate or tungstate interfere. A red-black color is obtained only with pentavalent vanadium. Tervalent iron gives a violet color, but this disappears in an acidic medium, while the color obtained with vanadic acid persists in this medium.

It is pointed out that of quite a number of similar Schiffs-bases have been tried and that none of these did give a specific color reaction with vanadium.

A convenient means for effecting a qualitative test for the presence of vanadium is a carrier such as filter paper impregnated with the novel reagent. Tests carried out with filter paper impregnated with the novel reagent show that the lower limit of detection of pentavalent vanadium with this reagent and with the spot-testing method is about 0.5 mcg. vanadate.

I claim:
1. For the detection of vanadium by means of a spot test, a bibulous material impregnated with the Schiff-base which is the reaction product of anthranilic acid and salicylaldehyde.
2. A method for the determination of vanadium which consists of admixing an aqueous solution of pentavalent vanadium and a benzenic solution of the Schiff-base which is the reaction product of anthranilic acid and salicylaldehyde, separating the organic phase and measuring the optical density at a predetermined wavelength in comparison with a calibration curve.
3. A reagent for the detection and determination of pentavalent vanadium comprising a solution of the compound formed from the reaction of anthranilic acid and salicylaldehyde, said salicylaldehyde being present in a molar excess ratio of 20 to 30 times of the aldehyde with respect to the acid.
4. A reagent in accordance with claim 3 wherein the solvent in the solution is a mixture of alcohol and benzene.
5. A process for preparing a reagent for the detection and determination of pentavalent vanadium comprising preparing a solution of anthranilic acid in a mixture of alcohol and benzene, and a solution of salicylaldehyde in alcohol, admixing the solutions and further diluting with benzene, said salicylaldehyde being present in a molar excess ratio of 20 to 30 times of the aldehyde with respect to the acid.
6. For the detection of vanadium by means of a spot test, a bibulous material impregnated with a solution of the compound formed from the reaction of anthranilic acid and salicylaldehyde, said salicylaldehyde being present in a molar excess ratio of 20 to 30 times of the aldehyde with respect to the acid.

7. The product of claim 6 wherein the solvent in the solution is a mixture of alcohol and benzene.

8. A method for the determination of vanadium comprising admixing an aqueous solution of pentavalent vanadium and a benzenic solution of the compound formed from the reaction of anthranilic acid and salicylaldehyde, said salicylaldehyde being present in a molar excess ratio of 20 to 30 times of the aldehyde with respect to the acid, separating the organic phase and measuring the optical density at a predetermined wave-length in comparison with a calibration curve.

9. A method in accordance with claim 8 wherein the benzenic solution also contains alcohol therein.

References Cited by the Examiner
UNITED STATES PATENTS
2,276,158   1/1940   Chenicek _____ 44—71

OTHER REFERENCES

Gilman et al., "Organic Synthesis," collective vol. 1, 1941, pp. 80–81.

Migrdichian, "Organic Synthesis," vol. 1, 1957, p. 151.

Tejendra, "Influence of Attached Rings . . . ," J. Indian Chem. Soc., vol. 11, 1934, pp. 23–32; through Chemical Abstracts, vol. 28, 1934, p. 37368.

MORRIS O. WOLK, *Primary Examiner.*